United States Patent

[11] 3,598,387

| [72] | Inventor | Robert M. Webster, Jr. |
| | | Emmaus, Pa. |
| [21] | Appl. No. | 838,191 |
| [22] | Filed | July 1, 1969 |
| [45] | Patented | Aug. 10, 1971 |
| [73] | Assignee | Mack Trucks, Inc. |
| | | Allentown, Pa. |

[54] SPRING END ASSEMBLY
7 Claims, 3 Drawing Figs.

| [52] | U.S. Cl. | 267/54 |
| [51] | Int. Cl. | F16f 1/26 |
| [50] | Field of Search | 267/54, 54 A, 54 C, 54 E |

[56] References Cited
UNITED STATES PATENTS

| 2,709,581 | 5/1955 | Roehrig | 267/54 |
| 3,079,138 | 2/1963 | Vogt et al. | 267/54 |
| 3,099,459 | 7/1963 | Zalar et al. | 267/54 |

Primary Examiner—James B. Marbert
Attorney—Brumbaugh, Graves, Donohue & Raymond

ABSTRACT: A spring end assembly for use in suspension systems of trucks and other vehicles including spring leaves of which two or more adjacent leaves are formed so that their end portions provide an enclosure or pocket for a rectangular spacer which is rotatably pinned to a spring bracket secured to the vehicle body. The pocket is closed by a bolt and spacer secured to the ends of the two leaves adjacent the rectangular spacer.

SPRING END ASSEMBLY

BACKGROUND OF THE INVENTION

This invention relates to an improved spring end assembly which eliminates the need for radius rods as the positioning means in motor vehicle rear suspension systems, and it accomplishes this with a simpler, less expensive and more reliable design than other known devices.

Leaf springs are currently widely used in the rear suspensions of trucks and other vehicles. Frequently these have consisted of slipper-type springs riding on cams attached to the vehicle frame, or similar arrangements. In such cases, the axle is located and resists torque reactions by means of two radius rods positioned forwardly from the axle to a bracket attached to the frame. By eliminating the radius rods as the positioning means for the suspension, a weight reduction and a considerable cost savings would result.

Various attempts have been made to achieve these advantages in prior art spring end assemblies but the innovations have often relied on complex mounting means, specially designed parts and/or arrangements susceptible to failure. In one such known assembly designed to mount the springs for pivotal action in two planes, a trunnion block is rotatably mounted about a longitudinal axis by a pair of trunnions received in bearings formed in the end of one or more leaf springs, a transverse shackle pin mounting the trunnion block in a bracket fixed to the vehicle frame. This results in the vertical loading forces being applied to the trunnions and shackle pin in cascade, thus accelerating their failure. Another type utilizes a leaf spring arrangement in which one or more leaves are wrapped around a bushing mounted on the vehicle frame. Here the vertical loading forces as well as the horizontal braking forces are applied on the leaf wrappings so that excessive forces unwrap such leaves.

Another suspension system has eliminated the radius rod and located the springs in a fore-and-aft position by a thrust block arrangement requiring a thrust bracket which is secured to each end of one of the leaf springs and engages a thrust block mounted in a bracket fixed to the frame. Such an arrangement subjects the leaf spring to compression forces and the thrust bracket bolts to shear forces, and results in horizontal clearances between the thrust brackets and thrust blocks which vary considerably in accordance with the loading and resultant flexing of the springs.

In still another suspension system, the fore-and-aft location of the springs is determined by a swinging link arrangement which rotatably couples a bolt mounted on a frame bracket with a pin around which one end of one or two leaf springs is wrapped to form an eye. During forward braking, the link arrangement is under tension, and during rearward braking the inertia of the vehicle frame drives the pin against the opening of the eye and/or rotates the link to subject the leaf springs to forces quite different from the normal loading forces for which the springs are designed.

Such trunnion blocks, links, eyes, bushings and similar expedients increase the cost and weight and reduce the operating life of the prior art suspensions.

It is the primary object of the present invention to provide an improved spring end assembly that avoids the shortcomings of existing assemblies.

It is another object of this invention to provide a spring end assembly which eliminates the need for radius rods and does this with a minimum number of elements which can be inexpensively and quickly mass produced and which will require a minimum amount of maintenance.

SUMMARY OF THE INVENTION

In brief, these and other objects of the invention are attained by providing a spring end assembly in which the end portions of two adjacent spring leaves are formed so that their end portions provide an enclosure or pocket. Preferably, the pocket is closed at the ends of the enclosure leaves by a bolt and spacer. In the preferred embodiment, a hardened rectangular spacer is received in the pocket and is rotatably pinned to a spring bracket secured to the vehicle body. The spring leaves adjacent the enclosure leaves may also be formed to reinforce the enclosure leaves.

DESCRIPTION OF THE DRAWINGS

For a better understanding of the invention, reference may be made to the following description of an exemplary embodiment, taken in conjunction with the accompanying drawings, in which.

DESCRIPTION OF THE EXEMPLARY EMBODIMENT

Figure 1:
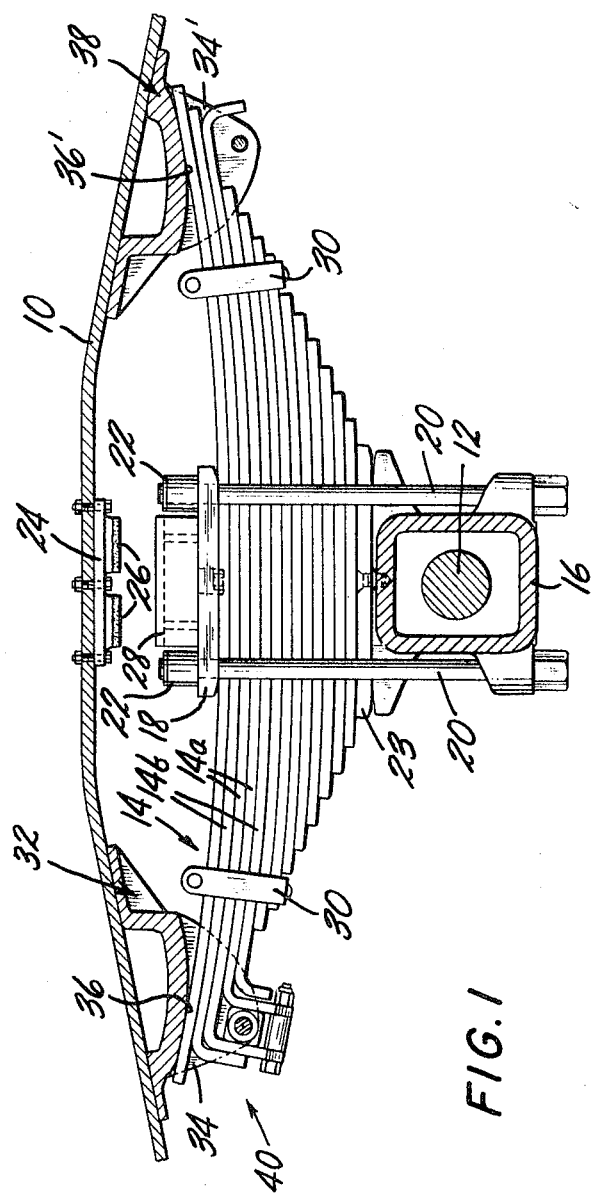
FIG. 1 is an elevational view of a leaf spring provided with an end assembly in accordance with the invention.

FIG. 1 illustrates a vehicle frame 10 supported on a rear axle 12 by a plurality of spring leaves 14. The leaves 14 of the suspension system are secured to an axle housing 16 receiving the axle 12 by a clamping plate 18 and a plurality of bolts which threadedly engage a pair of tie bars 22, each tie bar receiving a pair of bolts located on opposite sides of the spring leaves 14. A plate 23 is disposed between the lowermost leaf and the upper surface of the axle housing 16. A plate 24 mounted on the frame 10 has a plurality of bumpers 26 made of rubber or other suitable resilient material which, under extreme load conditions, engage a plate 28 mounted on the clamping plate 18 and so limit upward movement of the spring leaves 14 and axle 12. A pair of spring clips 30 assist in maintaining the leaves 14 in the desired parallel and adjacent alignment.

Figure 2:
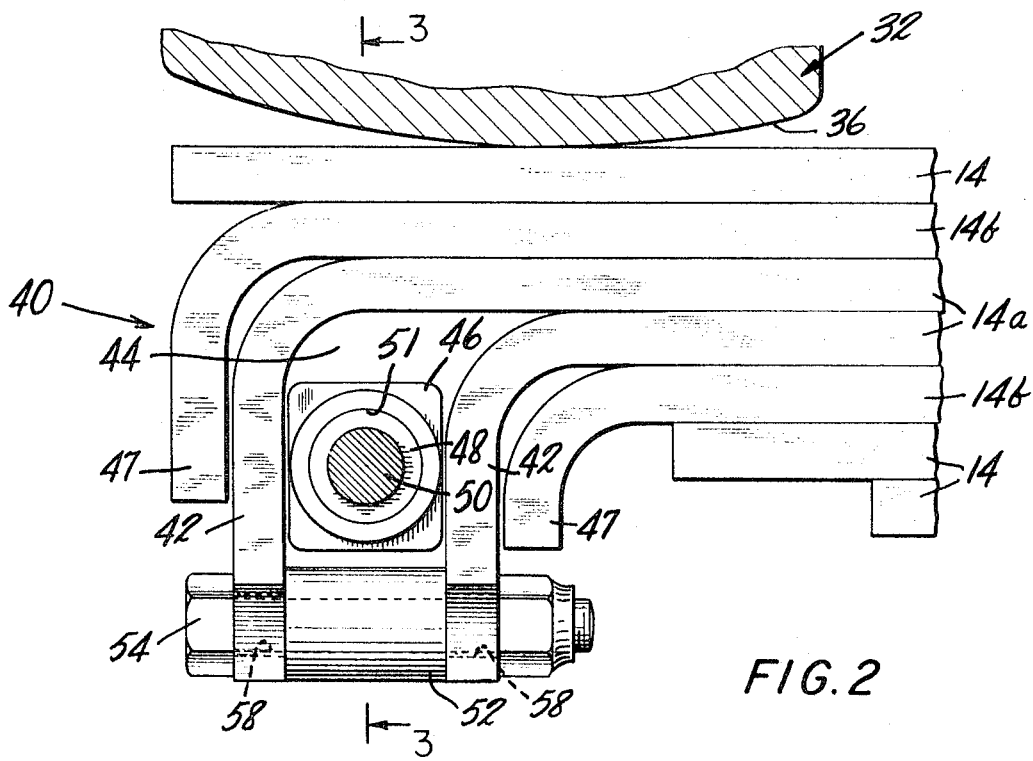
FIG. 2 is an enlarged elevational view of the spring end assembly of FIG. 1.
Figure 3:
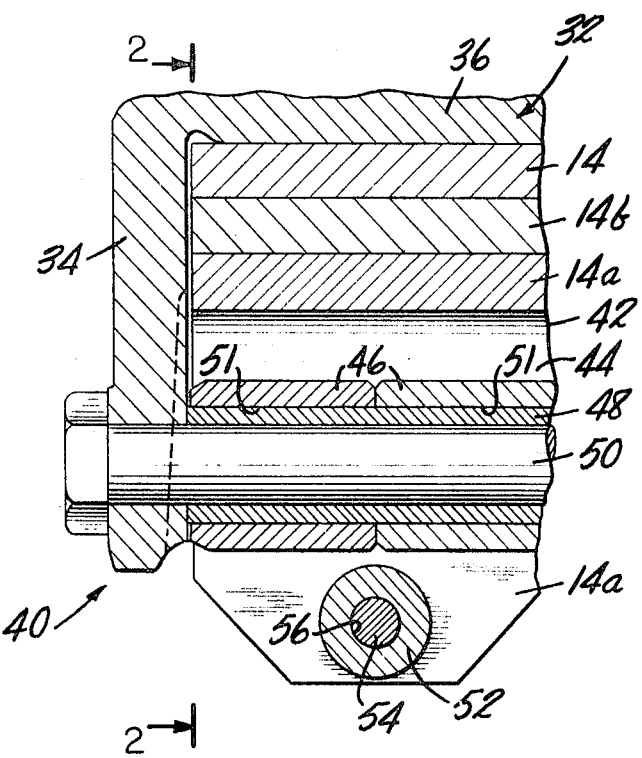
FIG. 3 is a partial sectional view taken along the line 3–3 of FIG. 2 and looking in the direction of the arrows.

A front spring bracket 32 (see also FIGS. 2 and 3) mounted on the frame 10 and having a pair of spaced, downwardly extending sidewalls 34 receives the front ends of the upper spring leaves 14. The front spring bracket is formed with a curved spring seat or cam 36 which bears against the uppermost leaf. A similar rear spring bracket 38 is mounted on the vehicle frame in spaced relation to the bracket 32 and supports the leaves 14 at their aft ends. Corresponding portions of the spring brackets 32 and 38 are indicated with the same reference numerals, primes being added to the numerals of the bracket 38.

A spring end assembly 40 embodying the invention is associated with the front spring bracket 32. A pair of adjacent leaves 14a are formed so that their end portions 42 provide a pocket or enclosure 44 which receives a pair of transverse hardened rectangular spacers 46. For example, the end portions 42 may be bent downwardly at spaced bending points and at approximately right angles to the main portion of these leaves to form the pocket 44. The spring leaves 14b, adjacent the enclosure leaves 14a, are formed, as by bending, so that their end portions 47 reinforce the end portions 42 of the leaves 14a. The spacers 46 are rotatably mounted from the sidewalls 34 of the spring bracket 32 by a sleeve 48, which in turn is carried by a pin 50 secured to the two sidewalls 34. The spacers 46 are bored at 51 so that they are rotatably carried by the sleeve 48, and the sleeve 48 is somewhat longer than the combined length of the spacers 46, to insure that the spacers are free to rotate on the sleeve 48.

The spacers 46 thus position the leaves 14 (and the axle 12 secured thereto) horizontally, regardless of fore-and-aft forces caused by braking, for example. It should be noted that the spacers 46 (as well as the sleeve 48 and the pin 50) are free of the vertical loading forces, inasmuch as these vertical forces act between the spring leaves and the spring seats 36 and 36'. Furthermore, the spacers 46 and the other elements of the spring end assembly 40 are only provided at the front end of the leaves 14, the rear end of these leaves being received in the rear spring bracket 38 to permit relative horizontal displacement between the leaves and the rear spring bracket, so that as the leaves flex under varying load conditions, the rear spring bracket does not limit horizontal movement of the spring leaves.

The pocket 44 is closed by a spacer 52, against which the end portions 42 of the leaves 14a are secured by a bolt 54 which passes through a bore 56 in the spacer 52 and suitable holes 58 in the enclosure leaf end portions 42. Because of the fact that the end portions 42 are secured together by the spacer 52 and the bolt 54, horizontal braking forces are always applied directly to three of the leaves 14a and 14b through their end portions—both of the leaves 14a and one of the leaves 14b, the particular leaf 14b being determined by the direction of the horizontal force. The amount of clearance between the rectangular spacers 46 and the enclosure or pocket 44 will vary, but since the spring ends are of the slipper type bearing against the cams 36 and 37', and especially when the suspension is employed for heavy duty service with low spring deflection, minimal clearances are satisfactory.

A spring end assembly is thus provided which has fewer parts than other known assemblies that eliminate radius rods and is free of complicated mounting devices and trunnion blocks and other elements which are expensive and subject to early failure. The novel spring end assembly according to the invention includes a minimum number of parts which may be inexpensively manufactured and which minimize weight and maintenance costs.

The embodiment of the invention described herein is illustrative only. Many variations and modifications may be made by one skilled in the art without departing from the spirit of the invention.

I claim:

1. A spring end assembly for a vehicle suspension system, comprising: a plurality of spring leaves, two adjacent leaves being formed so that their end portions are mutually spaced apart to provide an enclosure therebetween; means mounted on the vehicle frame for transmitting vertical loading forces to the spring leaves; a transverse positioning rod mounted on the vehicle frame and received in the enclosure for positioning the spring leaves horizontally, the transverse positioning rod restricting relative horizontal displacement between the transverse positioning rod and the enclosure providing spring leaves and permitting relative vertical displacement therebetween, so that the transverse positioning rod is free of the vertical loading forces; and means for securing the ends of the enclosure leaves together so as to close the enclosure.

2. A spring end assembly according to claim 1 in which at least one leaf adjacent the enclosure leaves is formed so that its end portion reinforces the adjacent enclosure leaf.

3. A spring end assembly for use in a vehicle suspension system and adapted to be mounted in a spring bracket secured to the vehicle body, comprising: a plurality of spring leaves, two adjacent leaves each being bent near their ends at spaced bending points to form a pocket therebetween; a spring seat formed in the spring bracket and bearing against one of the spring leaves for transmitting vertical loading forces to the spring leaves for transmitting vertical loading forces to the spring leaves; a transverse positioning rod received in the pocket and mounted on the spring bracket for positioning the pocket forming spring leaves horizontally the shape of the pocket and the disposition of the transverse positioning rod therein being such that the transverse positioning rod restricts relative horizontal displacement between the transverse positioning rod and the pocket forming spring leaves and permits relative vertical displacement therebetween, so that the transverse positioning rod is free of the vertical loading forces; and means secured to the ends of the pocket forming leaves for closing the pocket.

4. A spring end assembly according to claim 3 in which the two pocket forming leaves are bent downwardly at the spaced bending points, and at least one leaf adjacent the pocket forming leaves is bent downwardly near its end to reinforce the adjacent pocket-forming leaf.

5. A suspension system for supporting a vehicle frame on a rear axle for use with front an rear spring brackets mounted on the frame in longitudinally spaced relation, comprising: a plurality of spring leaves secured to the axle and having front and rear ends received in the respective spring brackets, two adjacent leaves being formed to provide a pocket at only one end between mutually spaced apart end portions thereof, the opposite ends of the leaves being received in the corresponding spring bracket to permit relative horizontal displacement therebetween; a spring seat formed in each spring bracket and bearing against the uppermost spring leaf for transmitting vertical loading forces to the spring leaves; a transverse positioning rod mounted on the spring bracket which receives the pocket forming ends of the two adjacent leaves, the positioning rod being received in the pocket to locate the spring leaves horizontally, the shape of the pocket and the disposition of the transverse positioning rod therein being such that the transverse positioning rod restricts relative horizontal displacement between the transverse positioning rod and the pocket forming spring leaves and permits relative vertical displacement therebetween, so that the transverse positioning rod is free of the vertical loading forces; and means for securing the ends of the pocket forming leaves together so as to close the pocket.

6. A suspension system for supporting a vehicle frame on a rear axle for use with front and rear spring brackets mounted on the frame in longitudinally spaced relation, comprising: a plurality of spring leaves secured to the axle and having front and rear ends received in the respective spring brackets, two adjacent leaves being formed to provide a pocket at only one end, the opposite ends of the leaves being received in the corresponding spring bracket to permit relative horizontal displacement therebetween; a transverse positioning rod mounted on the spring bracket which receives the pocket forming ends of the two adjacent leaves, the positioning rod being received in the pocket to locate the spring leaves horizontally; and means for securing the ends of the pocket forming leaves together so as to close the pocket, the means for closing the pocket including a spacer positioned between the end portions of the pocket forming leaves, and bolt means for securing the two pocket forming leaves to opposite sides of the spacer.

7. A suspension system for supporting a vehicle frame on a rear axle for use with front and rear spring brackets mounted on the frame in longitudinally spaced relation, comprising: a plurality of spring leaves secured to the axle and having front and rear ends received in the respective spring brackets, two adjacent leaves being formed to provide a pocket at only one end, the opposite ends of the leaves being received in the corresponding spring bracket to permit relative horizontal displacement therebetween; a transverse positioning rod mounted on the spring bracket which receives the pocket forming ends of the two adjacent leaves, the positioning rod being received in the pocket to locate the spring leaves horizontally, the transverse positioning rod including a horizontal pin secured to the spring bracket mounting the positioning rod, and at least one rectangular spacer having a bore therethrough and mounted for rotation about the pin; and means for securing the ends of the pocket forming leaves together so as to close the pocket.

PO-1050
(5/69)

UNITED STATES PATENT OFFICE
CERTIFICATE OF CORRECTION

Patent No. 3,598,387                           Dated  Aug. 10, 1971

Inventor(s)  Robert M. Webster, Jr.

It is certified that error appears in the above-identified patent and that said Letters Patent are hereby corrected as shown below:

Col. 3, line 18, "37'" should be --36'--;

Col. 3, line 58, delete "spring leaves for transmitting vertical loading forces to the";

Col. 3, line 61, after "horizontally" insert a comma; and

Col. 4, line 9, "an" should read --and--.

Signed and sealed this 21st day of March 1972.

(SEAL)
Attest:

EDWARD M. FLETCHER, JR.                ROBERT GOTTSCHALK
Attesting Officer                      Commissioner of Patents